US006406278B1

(12) United States Patent
De Matthaeis et al.

(10) Patent No.: US 6,406,278 B1
(45) Date of Patent: Jun. 18, 2002

(54) HIGH-PRESSURE PUMP WITH A REMOVABLE ON-OFF VALVE FOR FEEDING FUEL TO AN INTERNAL COMBUSTION ENGINE

(75) Inventors: Sisto Luigi De Matthaeis, Modugno; Angelo Beatrice, Bari, both of (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/608,374

(22) Filed: Jun. 30, 2000

(30) Foreign Application Priority Data

Jul. 2, 1999 (IT) ....................................... TO99A0573

(51) Int. Cl.[7] .......................... F04B 39/00; F04B 23/00; F04B 3/00; F16K 25/00

(52) U.S. Cl. ....................... 417/454; 417/441; 417/255; 137/454.4

(58) Field of Search ................................ 417/454, 441, 417/255; 137/454.4, 454.5

(56) References Cited

U.S. PATENT DOCUMENTS 4,530,335 A * 7/1985 Torizuka ..................... 123/495
5,050,636 A 9/1991 Sagawa et al. ............. 137/494
5,632,444 A * 5/1997 Camplin et al. .............. 239/88
5,979,297 A * 11/1999 Ricco ......................... 417/273
6,129,518 A * 10/2000 Ricco ......................... 417/206

FOREIGN PATENT DOCUMENTS

| | | | |
|---|---|---|---|
| DE | 0194431 | * | 9/1986 |
| DE | 196 52 831 | | 12/1996 |
| DE | 197 38 502 | | 9/1997 |

* cited by examiner

*Primary Examiner*—Charles G. Freay
*Assistant Examiner*—Michael K. Gray
(74) *Attorney, Agent, or Firm*—Merchant & Gould PC

(57) ABSTRACT

The pump has a body including at least a fuel compression chamber and an actuating chamber enclosing the actuating members of the pump; the on-off valve is defined by an independent operating assembly insertable in fluidtight manner inside a hole in the body; the hole connects an inlet conduit to the actuating chamber and to a feed conduit of the compression chamber; the assembly of the valve has a sleeve in turn having an opening located at the fuel feed conduit and which is closed by a shutter sliding inside the sleeve; the sleeve has two seats for two seals located on opposite sides of the opening; and the feed conduit is straight, and can be formed using a drilling tool through the hole.

4 Claims, 1 Drawing Sheet

HIGH-PRESSURE PUMP WITH A REMOVABLE ON-OFF VALVE FOR FEEDING FUEL TO AN INTERNAL COMBUSTION ENGINE

The present invention relates to a high-pressure pump with a removable on-off valve for feeding fuel to an internal combustion engine, particularly a vehicle engine.

BACKGROUND OF THE INVENTION

Various types of high-pressure fuel feed pumps are known, and which are generally supplied with fuel from a normal tank by a low-pressure pump. The high-pressure pump normally comprises an on-off valve, which is opened automatically by the fuel fed to it by the low-pressure pump.

The body of known high-pressure pumps encloses at least a fuel compression chamber, and an actuating chamber housing pump actuating members; and the on-off valve is formed in the pump body, and comprises a shutter designed to ensure fuel flow to the actuating chamber, even when the valve is closed, to lubricate and cool the actuating members.

In one known radial-piston pump in particular, the pump body houses three cylinders, in which slide respective pistons activated by a common cam carried by a shaft activated by the drive shaft; the cam is housed inside the actuating chamber or case of the pump; and the shutter is in the form of a hollow cylinder and slides along the wall of a radial hole in the pump body.

The pump body also has a fuel feed conduit for feeding fuel from the radial hole to the cylinders; the feed conduit is closed by the lateral wall of the shutter; and, to lubricate and cool the pump shaft, the cam, and the various pump body and piston friction surfaces, the shutter also has a calibrated axial hole permitting continuous fuel flow to the case.

To prevent fuel accumulating in an engine cylinder, in the event the respective injector breaks down, or to prevent fuel from being drawn from the actuating chamber in the event supply by the low-pressure pump is cut off, e.g. due to a fault, or in the event an emergency procedure is activated, the shutter is closed automatically by a compression spring when the pressure of the incoming fuel falls below a given value.

The spring rests on a perforated plate normally fixed, e.g. welded, to the opposite end of the guide hole of the shutter.

To ensure the high-pressure pump is also lubricated when fuel flow at the inlet is low—e.g. when the engine is turned on and the low-pressure pump is activated directly by the internal combustion engine—the on-off valve hole is connected directly to the actuating chamber by an auxiliary conduit.

In this known type of pump, machining the radial hole in the pump body, fixing the plate, and assembling the spring are difficult, high-cost operations involving considerable time and highly skilled personnel. Moreover, the perforated plate at the end of the hole facing the case limits to a certain extent the outside diameter of the cam and, hence, the capacity of the pump under given conditions.

Finally, the feed and auxiliary conduits are each defined by two holes arranged crosswise to each other inside the pump body and formed using a drilling tool from outside the hole; and both the cross holes must be closed at respective ends by forcing respective normally spherical plugs inside the holes.

SUMMARY OF THE INVENTION

It is an object of the invention to provide an extremely straightforward, reliable high-pressure pump having an on-off valve which is cheap to produce and easy to assemble, so as to eliminate the aforementioned drawbacks of known pumps with on-off valves.

According to the present invention, there is provided a high-pressure pump with a removable on-off valve for feeding fuel to an internal combustion engine, wherein the pump comprises a body including at least a fuel compression chamber and an actuating chamber enclosing actuating members of said pump, said on-off valve being connected to an inlet conduit of the pump, and is characterized in that said valve is defined by an independent operating assembly insertable in fluidtight manner inside a hole in said body; said hole connecting said inlet conduit to said actuating chamber.

BRIEF DESCRIPTION OF THE DRAWINGS

Two preferred, non-limiting embodiments of the invention will be described by way of example with reference to the accompanying drawings, in which.

DETAILED DESCRIPTION OF THE INVENTION

Figure 1:
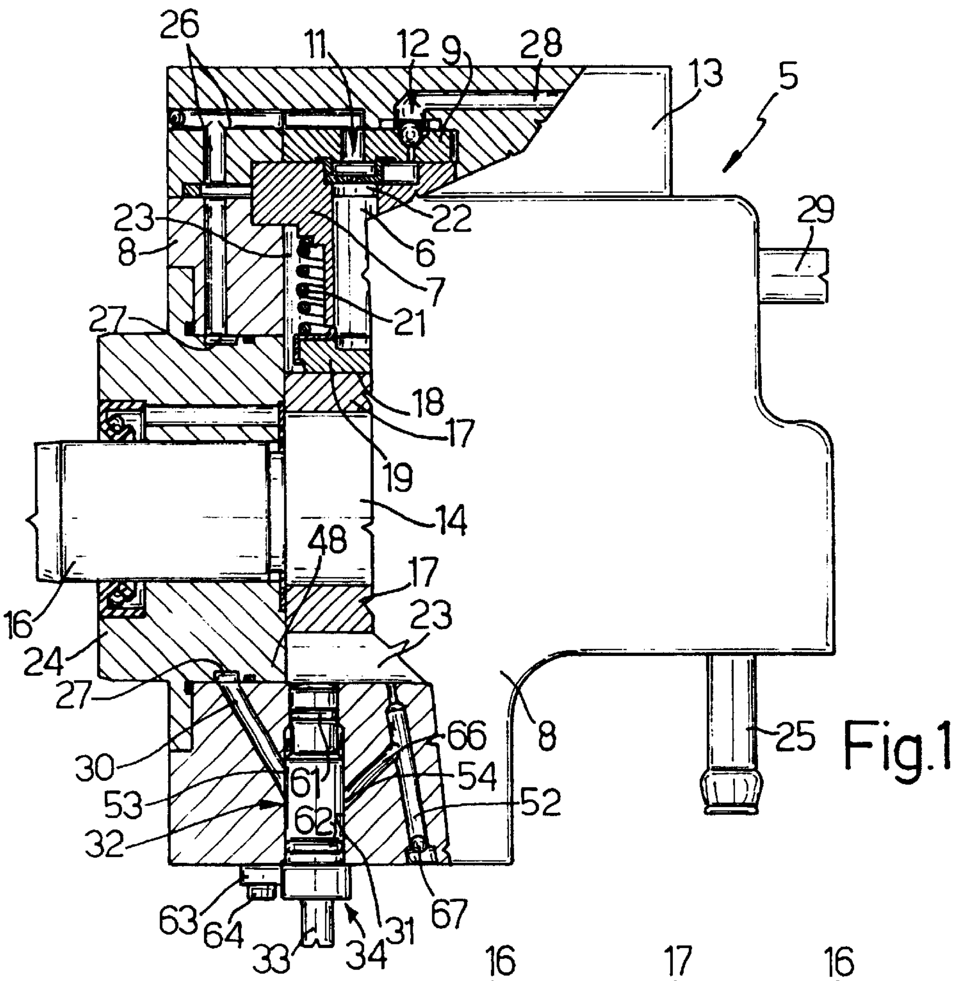
FIG. 1 shows a partly sectioned side view of a high-pressure pump with an on-off valve for feeding fuel to an internal combustion engine, in accordance with the invention.

Number 5 in FIG. 1 indicates as a whole a high-pressure pump for feeding fuel to an internal combustion engine, e.g. of a vehicle. Pump 5 is supplied with fuel from a normal tank by a low-pressure pump (not shown) powered by an electric motor energized when the engine is turned on.

High-pressure pump 5 is of the type comprising three radial pistons 6, which slide inside three cylinders 7 arranged radially inside a body 8 of pump 5; each cylinder 7 is closed by a plate 9 supporting an intake valve 11 and a delivery valve 12; and each cylinder 7 and respective plate 9 are locked to body 8 by a corresponding lock head 13.

Pistons 6 are activated in sequence by a single cam 14 integral with a shaft 16 powered by the internal combustion engine drive shaft. Cam 14 acts on pistons 6 via a ring 17 having, for each piston 6, a faced portion 18 cooperating with a shoe 19 fixed to piston 6; and each shoe 19 is pushed towards the cam by a corresponding spring 21.

The gap between the end of each piston 6 and respective plate 9 defines a compression chamber 22, so that the three compression chambers 22 are obviously housed inside body 8. The space inside body 8 housing cylinders 7 and in which shaft 16 and cam 14 rotate forms an actuating chamber 23 of pump 5, which chamber is closed by a flange 24 fixed in known manner to body 8; shaft 16 is fitted in rotary and fluidtight manner to flange 24; and chamber 23 communicates in known manner with a drain conduit 25 draining into the tank.

Body 8 is made of cast iron, and heads 13 of steel; body 8 and heads 13 have three intake conduits 26 communicating with a conduit defined by an annular groove 27 on flange 24; each conduit 26 also communicates with the corresponding compression chamber 22 via corresponding intake valve 11; and each head 13 also has a compression conduit 28, which, via corresponding delivery valve 12, connects compression chamber 22 to a delivery conduit 29 of pump 5.

Body 8 also has a feed conduit 30 communicating with annular groove 27 of flange 24 and, therefore, with compression chambers 22; and, at the other end, conduit 30 comes out at a cylindrical wall 31 of a cylindrical radial hole 32 formed in body 8 and communicating with actuating chamber 23. Hole 32 is connected to the low-pressure pump by an inlet conduit 33, and has an on-off valve indicated as a whole by 34.

Figure 3:
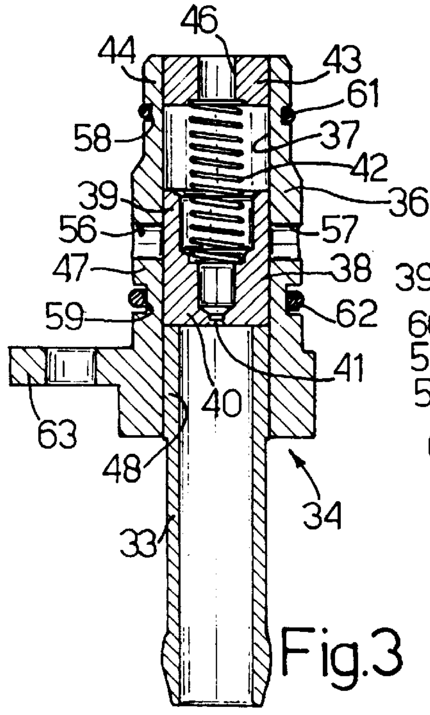
FIG. 3 shows a larger-scale section of the FIG. 2 on-off valve

According to the invention, on-off valve 34 is defined by an independent operating assembly insertable in fluidtight manner inside hole 32, and which can therefore be produced entirely separately from pump 5. The valve 34 assembly (FIG. 3) comprises a sleeve 36 having a cylindrical inner surface 37, in which slides a hollow cylindrical shutter 38.

More specifically, shutter 38 is piston- or cup-shaped, and comprises a cylindrical lateral wall 39, which slides accurately along inner surface 37 of sleeve 36, so that both inner surface 37 and the outer surface of wall 39 of shutter 38 must be machined to a high degree of precision.

Shutter 38 also comprises a flat wall 40 having a calibrated hole 41, which allows passage of a certain amount of fuel even when valve 34 is closed by shutter 38; and a helical compression spring 42 is inserted inside shutter 38 and rests on a supporting element.

More specifically, the supporting element is defined by a circular plate 43 fixed, e.g. force-fitted or welded, to the end of a first axial portion 44 of sleeve 36, and having a hole 46 allowing fuel flow from inlet conduit 33 to actuating chamber 23 (FIG. 1) to lubricate the moving, contacting parts, i.e. shaft 16, cam 14, ring 17 and shoes 19 of pistons 6.

Figure 2:
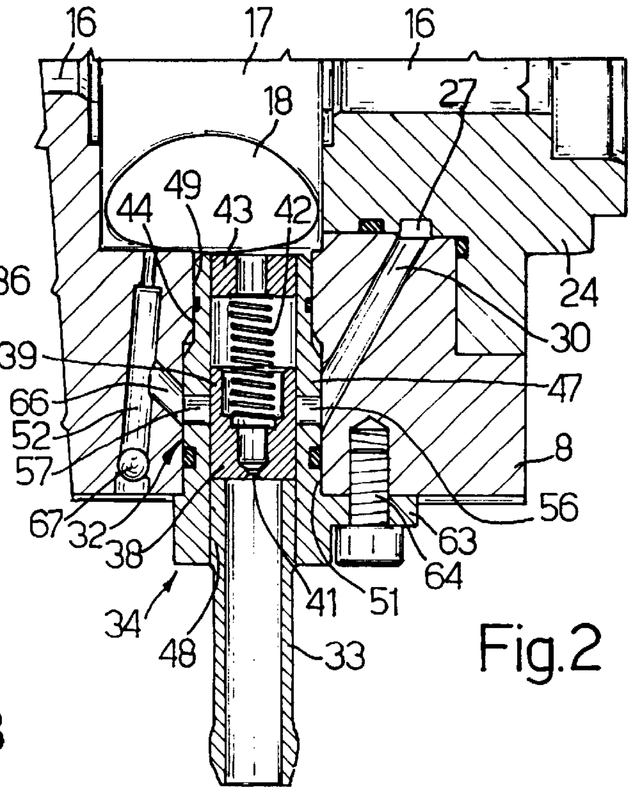
FIG. 2 shows a larger-scale, specular partial section of a portion of FIG. 1.

Sleeve 36 also comprises a second axial portion 47 (FIGS. 2 and 3) to which one end 48 of fuel inlet conduit 33 is connected. The outside diameter of portion 47 is greater than that of portion 44, so that radial hole 32 comprises an axial portion 49 for housing portion 44 of sleeve 36, and a larger-diameter axial portion 51 for housing portion 47 of sleeve 36.

Body 8 of pump 5 has an auxiliary conduit 52 located between hole 32 and actuating chamber 23 to ensure sufficient lubrication of the moving parts even in the event of insufficient fuel flow from conduit 33. Both conduits 30 and 52 terminate at wall 31 of hole 32 in two openings 53 and 54 (FIG. 1) located at larger-diameter portion 51 of hole 32 and preferably the same distance from the outer end of hole 32.

Portion 47 (FIGS. 2 and 3) of sleeve 36 has two radial openings 56 and 57, which, in use, are positioned at openings 53 and 54 in hole 32, and, at rest, are closed by lateral wall 39 of shutter 38. Each portion 44, 47 of sleeve 36 has a respective annular seat 58, 59 for housing a respective elastic seal 61, 62; seat 59 is located at portion 47 so that openings 56 and 57 are between the two seals 61 and 62; and portion 47 has an appendix or flange 63, which is connected removably to body 8 of pump 5 by means of a screw 64.

According to one particular aspect of the invention, the diameter of portion 51 of hole 32, and therefore the outside diameter of portion 47 of sleeve 36, is so selected as to enable feed conduit 30 to be formed using a drilling tool through portion 51 of hole 32, so that conduit 30 slopes with respect to the axis of hole 32, but requires no plug.

Auxiliary conduit 52 in turn may be so located as to be connected to hole 32 by a portion 66 sloping with respect to the axis of hole 32 and also formed using a drilling tool through portion 51 of hole 32. More specifically, auxiliary conduit 52 may slope slightly with respect to the axis of hole 32, so as to shorten portion 66, and, in any case, requires only one ball plug 67 to close the end outwards of the body of pump 5.

As compared with known pumps, the advantages of the high-pressure pump according to the invention will be clear from the foregoing description. In particular, the independent operating assembly of valve 34 makes valve 34 easier and cheaper to manufacture, and also prevents any interference between ring 17 of cam 14 and supporting plate 43 of spring 42, thus enabling an increase in pump capacity by simply increasing the diameter of cam 14.

The larger diameter of the outer portion 51 of hole 32 in turn enables feed conduit 30 and/or portion 66 of auxiliary conduit 52 to be formed using a drilling tool through hole 32, thus further simplifying the machining of conduits 30 and 52. And finally, not guiding the movement of shutter 38, surface 31 of hole 32 need not be machined to a high degree of precision, thus further reducing machining cost.

Clearly, changes may be made to the high-pressure pump as described herein without, however, departing from the scope of the accompanying claims. For example the pistons 6 of pump 5 may be arranged otherwise than as described; the pump may be applied to other than a vehicle engine; and auxiliary conduit 52 may be dispensed with.

What is claimed is:

1. A high-pressure pump for feeding fuel to an internal combustion engine, comprising a body housing at least one cylinder in which a piston slides, a fuel compression chamber defined by said cylinder and said piston, said body defining a substantially cylindrical hole for housing a removable on-off valve, said hole including an inner axial portion having a predetermined diameter and an outer portion having a diameter larger then said predetermined diameter, a feed conduit provided in said body and communicating with said compression chamber and with the outer portion of said hole, said valve comprising a sleeve having inner and outer portions to be fitted in fluidtight manner inside the portions of said hole, a terminal opening of said feed conduit being located at said larger diameter portion, the outer portion of said sleeve having a radial opening, a cup-shaped shutter slidable in said sleeve and including at an outer end a flat wall defining a calibrated hole, said shutter being held by a compression spring in a rest position to close said radial opening, a flange integral with said sleeve and adapted to be secured removably to said body in an angular position so that said radial opening faces said terminal opening, said feed conduit being straight and sloping with respect to an axis of the hole on said body, wherein said larger diameter portion of the hole on said body being sized and said terminal opening being located to allow a drilling tool to drill said feed conduit through said larger diameter portion of the hole on said body.

2. A high-pressure pump as claimed in claim 1, wherein said body further includes an actuating chamber housing piston actuating members, and said compression spring is inserted in said shutter between said flat wall and a perforated plate force-fitted at an inner end of said sleeve, said actuating chamber communicating with the hole on said body through the calibrated hole of said flat wall and said perforated plate, said body further including an auxiliary conduit having a respective terminal opening also located at said larger diameter portion, said auxiliary conduit connecting the hole on said body directly to said actuating chamber, said sleeve having a further radial opening located to face said respective terminal opening when said flange is so secured, said auxiliary conduit comprising a straight portion sloping with respect to said axis, and said respective terminal opening being located to allow a drilling tool to drill said feed conduit through said larger diameter portion of the hole on said body.

3. A high-pressure pump as claimed in claim 2, wherein a fluidtight seal between said sleeve and said portions of the hole on said body is achieved by means of two seals housed inside two annular seats located on a correspondent one of the portions of the hole on said body at opposite sides of said radial openings.

4. A high-pressure pump for feeding fuel to an internal combustion engine, comprising a body housing a plurality of radial cylinders, each one of said cylinders cooperating with a corresponding sliding piston, said cylinders and the corresponding piston defining a plurality of fuel compression chambers, said body defining an actuating chamber housing, a cam rotatable for sequentially actuating said pistons, said cam being carried by a shaft fitted in rotary and fluidtight manner to a flange, said flange closing said actuating chamber housing, said body defining a substantially cylindrical hole positioned radially with respect to said shaft and communicating with said actuating chamber, said hole including an inner axial portion having a predetermined diameter and an outer portion having a diameter larger then said predetermined diameter, a fuel feed conduit provided in said body and communicating at one end with said outer portion of said hole and at the other end with an annular groove provided on said flange and communicating with said compression chambers, an on-off valve adapted to be removably mounted in said hole, said valve comprising a sleeve having inner and outer portions adapted to be fitted in a fluidtight manner into said portions of said hole, an inlet conduit connected to said hole adjacent to said sleeve, a terminal opening of said feed conduit being located at said larger diameter portion, the outer portion of said sleeve defining a radial opening, said body having an auxiliary conduit having a respective terminal opening also located at said larger diameter portion, said auxiliary conduit connecting the hole on said body directly to said actuating chamber, said sleeve having a further radial opening located to face said respective terminal opening, a cup-shaped shutter slidable in said sleeve and including at an outer end a flat wall defining a calibrated hole, said shutter being held by a compression spring in a rest position to close said radial opening, said compression spring being inserted in said shutter between said flat wall and a perforated plate force-fitted at an inner end of said sleeve, said actuating chamber also communicating with the hole on said body through the calibrated hole of said flat wall and said perforated plate, a flange integral with said sleeve and removably coupled to said body in an angular position so that said radial opening faces said terminal opening of said feed conduit and said further radial opening faces said respective radial opening of said auxiliary conduit, said feed conduit being straight and sloping with respect to an axis of said hole on said body, said auxiliary conduit comprising a straight portion also sloping with respect to said axis, said larger diameter portion of said hole being sized and said terminal openings being located to allow a drilling tool to drill said sloping feed conduit and said sloping portion of said auxiliary conduit through said larger diameter portion of said hole.

* * * * *